United States Patent [19]

Haugsjaa

[11] 4,295,137
[45] Oct. 13, 1981

[54] ELECTROLUMINESCENT DISPLAY DRIVER SYSTEM FOR THIN-FILM ELECTROLUMINESCENT DEVICES REQUIRING ELECTRIC FIELD REVERSAL

[75] Inventor: Paul O. Haugsjaa, Acton, Mass.

[73] Assignee: GTE Laboratories Incorporated, Waltham, Mass.

[21] Appl. No.: 110,161

[22] Filed: Jan. 7, 1980

[51] Int. Cl.³ .............................................. G06F 3/14
[52] U.S. Cl. .................................. 340/781; 340/713; 340/166 EL; 340/719
[58] Field of Search ................ 340/166 EL, 713, 714, 340/718, 719, 781

[56] References Cited

U.S. PATENT DOCUMENTS

| | | | |
|---|---|---|---|
| 2,995,682 | 8/1961 | Livingston | 340/166 EL |
| 3,054,929 | 9/1962 | Livingston | 340/166 EL |
| 3,098,173 | 7/1963 | Livingston | 340/166 EL |
| 3,246,202 | 4/1966 | Rhodes | 340/166 EL |
| 3,409,887 | 11/1968 | Blank | 340/166 EL |
| 3,609,747 | 9/1971 | Ngo | 340/166 EL |
| 4,028,692 | 6/1977 | Ngo | 340/166 EL |
| 4,087,792 | 5/1978 | Asars | 340/166 EL |
| 4,110,664 | 8/1978 | Asars et al. | 340/166 EL |
| 4,152,626 | 5/1979 | Hatta et al. | 340/166 EL |
| 4,237,456 | 12/1980 | Kanatani | 340/719 |

OTHER PUBLICATIONS

*Thin-Film EL Displays;* Suzuki et al.; Information Display; vol. 13, Spring 1977, pp. 14-19.

*Primary Examiner*—Marshall M. Curtis
*Attorney, Agent, or Firm*—William R. McClellan

[57] ABSTRACT

A display system includes a plurality of thin-film electroluminescent elements each having a digit electrode and a segment electrode, a set of digit drivers, and a set of segment drivers. The digit drivers and the segment drivers are operative, during precharging portions of digit and segment control signals, to precharge the elements of the display by applying a first voltage to the digit electrode and a second voltage to the segment electrode of each element. The digit drivers are further operative, during addressing portions of the digit control signal, to selectively address elements of the display by applying the second voltage to the digit electrodes of the elements which are to be addressed and by applying the first voltage to the digit electrodes of the elements which are not to be addressed. The segment drivers are further operative, during energizing portions of the segment control signal, to selectively energize elements which are addressed by applying the first voltage to the segment electrodes of the elements which are to be energized and by applying the second voltage to the segment electrodes of the elements which are not to be energized. The first voltage can be ground potential and the second voltage can be a positive dc voltage which is greater than the threshold voltage of the electroluminescent elements.

15 Claims, 3 Drawing Figures

ELECTROLUMINESCENT DISPLAY DRIVER SYSTEM FOR THIN-FILM ELECTROLUMINESCENT DEVICES REQUIRING ELECTRIC FIELD REVERSAL

This invention relates to thin-film electroluminescent displays and, more particularly, to drive systems and methods for driving electroluminescent displays.

Thin-film electroluminescent (EL) devices are useful for information display and are particularly useful in locations with high ambient light conditions, such as automobiles and aircraft cockpits, since the information displayed retains its visibility in high ambient light. Furthermore, thin-film EL devices require no secondary lighting under dark conditions as do liquid crystal displays.

Thin-film electroluminescent devices typically include a manganese doped zinc sulfide layer sandwiched between dielectric layers. Electrodes are attached to the dielectric layers. Light is emitted upon application of an alternating electric field. Such devices have been described in the prior art.

A number of EL devices or elements can be arranged in a pattern to form an EL display in which the elements can be selectively energized. Seven-segment numeric displays and matrix displays having rows and columns of EL elements are examples of such patterns. When displays have large numbers of individual elements, it has been common practice to sequentially energize portions of the display and to rely on the integrating effect of the device or of the human eye to produce a continuous display. This practice reduces the number of driver circuits required for a given number of display elements. For example, four 7-segment display digits require 28 drivers for continuous operation, but require only 11 drivers for sequential operation.

EL devices require electric field reversal to produce illumination and are typically energized by ac voltage sources. The ac can be controlled by triacs. Another approach to driving EL displays was shown in U.S. Pat. No. 4,152,626 issued May 1, 1979, to Hatta et al. Unipolar pulses are applied first to one electrode and then to the other electrode to achieve electric field reversal. EL elements not selected are switched to an open-circuit condition. However, as described therein, the open-circuiting of non-selected lines provides stray current paths to ground and can cause non-selected EL elements to emit light. To avoid this problem, compensation pulses lower in amplitude than the selection pulses are applied to non-selected EL elements, thereby complicating the system.

It is desirable to provide a simple EL display driver system which has minimum parts count, can be driven directly by standard logic signals, and can be operated from a single dc voltage.

SUMMARY OF THE INVENTION

According to the present invention, these and other objects and advantages are achieved in an electroluminescent display system comprising a plurality of thin-film electroluminescent elements, a set of digit driver means, and a set of segment driver means. Each of the electroluminescent elements has a digit electrode and a segment electrode and has associated therewith a characteristic electroluminescent threshold voltage. Each of the set of digit driver means is selectively coupled to digit electrodes of the elements of the display and has an input terminal for receiving a digit control signal including precharging portions and addressing portions. Each of the set of segment driver means is selectively coupled to segment electrodes of the elements of the display and has an input terminal for receiving a segment control signal including precharging portions and energizing portions which are simultaneous with the addressing portions of the digit control signal. The set of digit driver means and the set of segment driver means are operative, during precharging portions of the digit and segment control signals, to precharge the elements of the display by applying a first voltage to the digit electrode and a second voltage to the segment electrode of each element of the display. The first and second voltages have a difference therebetween which is greater in magnitude than the threshold voltage. The set of digit driver means is further operative, during addressing portions of the digit control signal, to selectively address elements of the display by applying the second voltage to the digit electrodes of the elements of the display which are to be addressed and by applying the first voltage to the digit electrodes of the elements of the display which are not to be addressed. The set of segment driver means is further operative, during energizing portions of the segment control signal, to selectively energize elements of the display which are addressed by applying the first voltage to the segment electrodes of the elements which are to be energized and by applying the second voltage to the segment electrodes of the elements which are not to be energized.

For a better understanding of the present invention, together with other and further objects, advantages, and capabilities thereof, reference is made to the following disclosure and appended claims in connection with the above-described drawings.

DETAILED DESCRIPTION OF THE INVENTION

Figure 1:
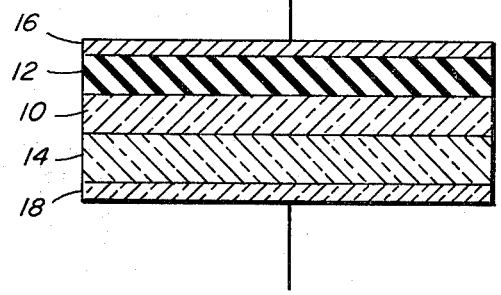
FIG. 1 illustrates a thin-film electroluminescent element.

Referring now to FIG. 1, there is shown an insulated electrode thin-film electroluminescent (EL) display element. An electroluminescent layer 10 is typically sandwiched between dielectric layers 12 and 14. Conductive electrodes 16 and 18 are applied to the outer surfaces of the dielectric layers 12 and 14. The electroluminescent layer 10 can be a compound having the formula AB wherein A is selected from the group consisting of zinc and cadmium and B is selected from the group consisting of oxygen, sulfur, selenium, and tellurium. Alternatively, the EL layer 10 can be a compound having the formula $AB_2$ wherein A is selected from the group consisting of zinc and cadmium and B is selected from the group consisting of fluorine, chlorine, bromine, and iodine. The AB or $AB_2$ compound is doped with manganese, a rare earth element, or mixtures thereof. One common electroluminescent compound is zinc sulfide doped with manganese. The electroluminescent layer 10, the dielectric layer 14, and the electrode 18 are transparent to permit emitted light to escape from the device. The dielectric layer 12 and the electrode 16 are opaque. Further details regarding the construction of EL devices are disclosed by Hatta et al in U.S. Pat. No. 4,152,626 and by Suzuki et al in "Thin Film EL Displays", Information Display, Vol. 13, Spring 1977, pp. 14–19.

When a voltage, sufficient to cause an electric field of about $10^6$ volts per centimeter in the electroluminescent layer 10, is applied to the electrodes 16 and 18, electrons trapped in surface states of the EL layer 10 are released and a pulse of light is emitted by the layer 10. The voltage which causes an electric field sufficient to produce light emission is called the electroluminescent threshold voltage. When the electric field is reversed, the same electrons are released from the opposite surface of the EL layer 10 and a second pulse is emitted. Thus, in a practical application of an EL display element, electric potentials which result in a field reversal are applied to the device when light emission is desired.

Figure 2:
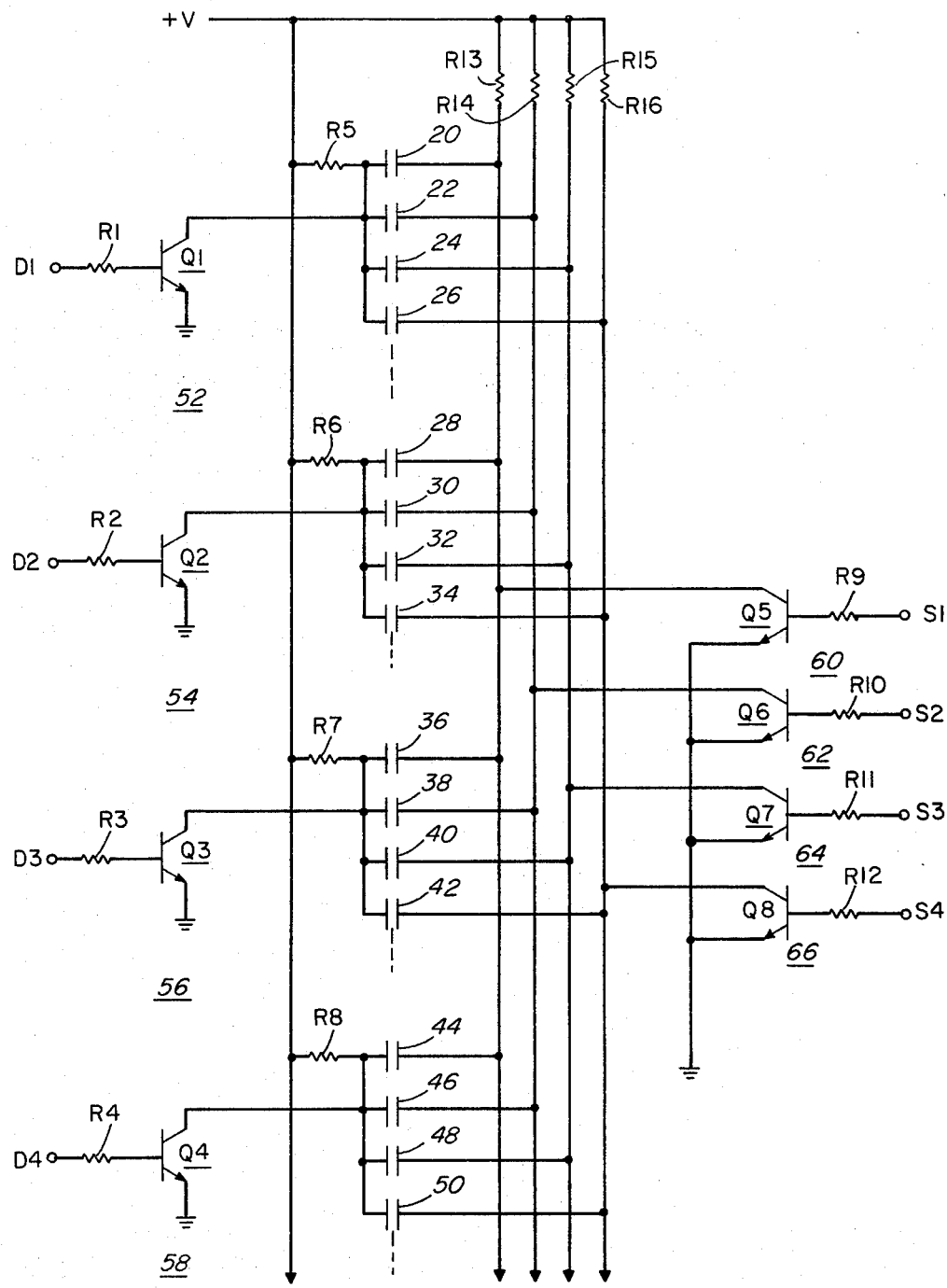
FIG. 2 depicts an electroluminescent display system according to the present invention.

An electroluminescent display system according to the present invention is shown in FIG. 2. The display includes electroluminescent display elements 20–50, each being constructed as shown in FIG. 1. The electrodes corresponding to electrodes 16 and 18 in FIG. 1 are arbitrarily designated as a digit electrode and a segment electrode. There is no polarity associated with EL elements and the electrical connections can be reversed with no adverse effect. Digit drivers 52, 54, 56, and 58 are coupled to digit electrodes of the display elements 20–26, 28–34, 36–42, and 44–50, respectively. Segment drivers 60, 62, 64, and 66 are coupled to digit electrodes of the display elements 20, 28, 36, 44; 22, 30, 38, 46; 24, 32, 40, 48; and 26, 34, 42, 50, respectively.

In digit driver 52, an input terminal D1 is coupled through a base resistor R1 to the base of a transistor Q1. The collector of the transistor Q1 is coupled to the digit electrodes of the EL elements 20–26. In digit driver 54, an input terminal D2 is coupled through a base resistor R2 to the base of a transistor Q2. The collector of the transistor Q2 is coupled to the digit electrodes of the EL elements 28–34. In digit driver 56, an input terminal D3 is coupled through a base resistor R3 to the base of a transistor Q3. The collector of the transistor Q3 is coupled to the digit electrodes of the EL elements 36–42. In digit driver 58, an input terminal D4 is coupled through a base resistor R4 to the base of a transistor Q4. The collector of the transistor Q4 is coupled to the digit electrodes of the EL elements 44–50. The collectors of the transistors Q1–Q4 are coupled through resistors R5–R8, respectively, to a dc voltage +V. The emitters of the transistors Q1–Q4 are coupled to a reference potential such as ground.

In segment driver 60, an input terminal S1 is coupled through a base resistor R9 to the base of a transistor Q5. The collector of the transistor Q5 is coupled to the segment electrodes of the EL elements 20, 28, 36, and 44. In segment driver 62, an input terminal S2 is coupled through a base resistor R10 to the base of a transistor Q6. The collector of the transistor Q6 is coupled to the segment electrodes of the EL elements 22, 30, 38, and 46. In segment driver 64, an input terminal S3 is coupled through a base resistor R11 to the base of a transistor Q7. The collector of the transistor Q7 is coupled to the segment electrodes of the EL elements 24, 32, 40, and 48. In segment driver 66, an input terminal S4 is coupled through a base resistor R12 to the base of a transistor Q8. The collector of the transistor Q8 is coupled to the segment electrodes of the EL elements 26, 34, 42, and 50. The collectors of the transistors Q5–Q8 are coupled through resistors R13–R16, respectively, to the dc voltage +V. The emitters of the transistors Q5–Q8 are coupled to the reference potential such as ground.

Although the EL display of FIG. 2 contains 16 EL elements, it will be obvious to those skilled in the art that an EL display according to the present invention can contain any number or arrangement of EL elements. One example is a seven segment numeric display which can be used in clocks or other numeric readouts. Seven segment drivers and one digit driver per digit of the readout are required. Another example is a matrix display which can be used for alphanumeric or graphic display. The elements of matrix displays are usually arranged in rows and columns and require one driver per row and one driver per column.

The dc voltage +V is typically about 200 volts and can be obtained from any high voltage dc power supply. The required voltage may be higher or lower depending on the characteristics of the EL layer. The transistors Q1–Q8 can be 2N6517, although any switching device capable of operation at 200 volts is suitable.

When a positive voltage is applied to any of the input terminals D1–D4 and S1–S4, the corresponding transistor is turned on and the electrode of the EL element is at about ground potential. The input voltages required to turn on Q1–Q8 can be any convenient positive voltage above 0.7 volt but are commonly logic voltages such as 5 volts. When a voltage below 0.7 volt is applied to any of the input terminals D1–D4 and S1–S4, the corresponding transistor is turned off and the electrode of the EL element is at the dc voltage +V. Thus, the digit drivers 52–58 and the segment drivers 60–66 invert the voltages appearing at their respective inputs and switch the electrodes of the EL elements 20–50 between the dc voltage +V and ground potential.

Figure 3:
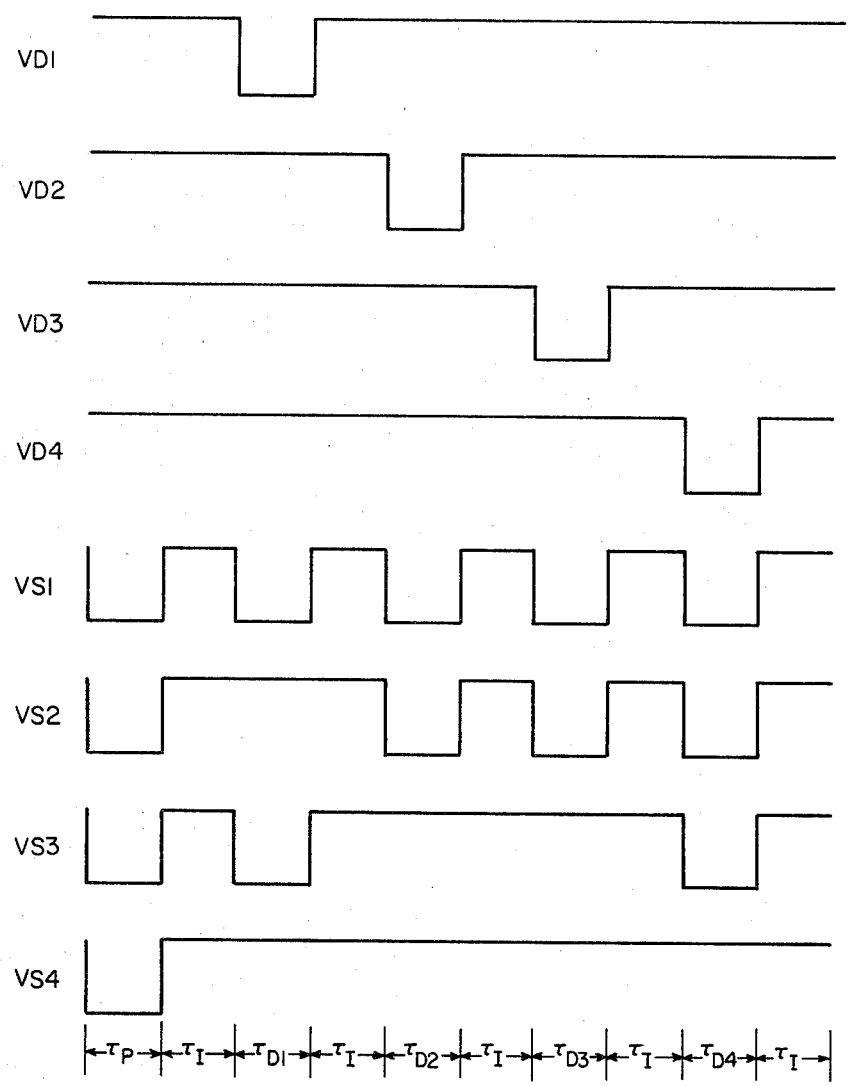
FIG. 3 depicts an example of voltage waveforms which can be applied to the display system of FIG. 2.

FIG. 3 illustrates an example of digit control signals VD1–VD4 which can be applied to the input terminals D1–D4 and segment control signals VS1–VS4 which can be applied to the input terminals S1–S4 to operate the EL display. The waveforms shown are all logic voltages and represent one cycle of a repetitive signal. Vertically aligned portions of the signals shown in FIG. 3 occur at the same time. The digit control signals VD1–VD4 include precharging portions during the time designated by $\tau_p$, addressing portions during the times designated by $\tau_{D1}$, $\tau_{D2}$, $\tau_{D3}$, and $\tau_{D4}$, and interdigital portions during the times designated by $\tau_I$. The segment control signals VS1–VS4 include precharging portions during the time designated by $\tau_p$, energizing portions during the times designated by $\tau_{D1}$, $\tau_{D2}$, $\tau_{D3}$, and $\tau_{D4}$, and interdigital portions during the times designated by $\tau_I$. The voltages applied to the electrodes of the EL elements are the inverse of the respective control signals VD1–VD4 and VS1–VS4. Thus, during the precharging portions at time $\tau_p$ of the control signals, digit control signals VD1–VD4 are high and ground potential is applied to the digit electrodes of the EL elements 20–50. Segment control signals VS1–VS4 are low and the dc voltage +V is applied to the segment electrodes of the EL elements 20–50. The precharging portions of the signals operate to polarize the EL elements 20–50 of the display by making the segment electrodes positive with respect to the digit electrodes. The precharging portions are repeated at least once during each complete cycle of the display.

During the addressing portions at times $\tau_{D1}$–$\tau_{D4}$ of the digit control signal, the EL elements are selectively addressed by applying the dc voltage +V to the digit electrodes of the EL elements being addressed. That is, during time $\tau_{D1}$ EL elements 20-26 are raised to the dc voltage +V, during the time $\tau_{D2}$ EL elements 28-34 are raised to the dc voltage +V, during the time $\tau_{D3}$ EL elements 36-42 are raised to the dc voltage +V, and during the time $\tau_{D4}$ EL elements 44-50 are raised to the dc voltage +V. During the addressing of a particular group of EL elements, the digit electrodes of the EL elements not being addressed are maintained at ground potential.

During the energizing portions of the segment control signals at times $\tau_{D1}$-$\tau_{D4}$, the EL elements which are addressed are selectively energized by applying ground potential to the segment electrodes of the EL elements being energized. The dc voltage +V is applied to the segment electrodes of the EL elements not being energized. It is seen that, with respect to the digit electrode, the segment electrode of an EL element which is addressed and energized has been changed from positive during precharging to negative during addressing and energizing, thus accomplishing a field reversal in the EL element. As discussed hereinabove, the field reversal within the EL element results in the emission of light. The EL elements addressed but not energized do not experience a field reversal since the dc voltage +V is applied to both digit and segment electrodes and no light emission occurs.

Referring now to FIGS. 2 and 3, during time $\tau_{D1}$ digit control signal VD1 is low and the dc voltage +V is applied to the EL elements 20, 22, 24, and 26, thereby causing these elements to be addressed. Also during the time $\tau_{D1}$, segment control signal VS2 is high and ground potential is applied to the EL elements 22, 30, 38, and 46. Thus, EL element 22 is both addressed and energized and provides light emission during the time $\tau_{D1}$. By the same analysis, it can be seen that EL element 26 also provides light emission during time $\tau_{D1}$. Likewise, EL elements 32 and 34 provide light emission during time $\tau_{D2}$, EL elements 40 and 42 provide light emission during time $\tau_{D3}$, and EL element 50 provides light emission during time $\tau_{D4}$.

During the interdigital portions of the digit control signals VD1-VD4 and the segment control signals VS1-VS4 at times $\tau_I$, the control signals VD1-VD4 and VS1-VS4 are high and ground potential is applied to the digit electrodes and the segment electrodes of the EL elements 20-50. Since both electrodes of the EL elements 20-50 are maintained at substantially the same voltage, the electrodes of the EL elements are discharged before the next addressing operation. This discharging of the EL elements 20-50 protects the transistors Q1-Q8 from high voltage transients which can be generated when rapid voltage reversals are applied to the EL elements 20-50. In general, the interdigital portions of the control signals can be omitted when the transistors Q1-Q8 have sufficient voltage rating to withstand the above-mentioned voltage transients. Alternatively, the dc voltage +V can be applied to the digit and segment electrodes of the EL elements during the interdigital period. The essential requirement is that substantially the same voltage be applied to both electrodes of the EL elements.

It is to be understood that the waveforms shown in FIG. 3 are but one example of suitable waveforms. The digit control signals VD1-VD4 and the segment control signals VS1-VS4 can be inverted from what is shown without affecting the operation of the display.

Furthermore, the dc voltage can be negative with respect to ground potential or the digit and segment control signals can be interchanged. The essential requirement is that a field reversal be applied to the EL elements which are to provide light emission. This is accomplished by first applying a firt voltage to the digit electrode and a second voltage to the segment electrode of the EL element. Next, the first voltage is applied to the segment electrode and the second voltage is applied to the digit electrode. Thus, a voltage reversal has occurred and light is emitted by the EL element. To produce light emission, the magnitude of the difference between the first voltage and the second voltage must be greater than the magnitude of the electroluminescent threshold voltage described hereinabove.

EL displays are typically refreshed about 60-6000 times per second. Since the EL elements produce pulses of light upon field reversal, the refresh rate can be reduced to produce dimming of the display. Also, the relative times of the address portions and the interdigital portions of the control signals VD1-VD4 and VS1-VS4 are not critical. It is further noted that the dc voltage +V can be turned off during the interdigital portions of the control signals not only to reduce power consumption but also to permit the use of transistors Q1-Q8 with lower power rating. The switching off of the dc voltage +V must be synchronized with the timing of the control signals VD1-VD4 and VS1-VS4.

Thus, there is provided by the present invention a simple low cost EL display system which can be driven by logic signals and which can be powered by a single dc voltage. While there has been shown and described what is at present considered the preferred embodiment of the invention, it will be obvious to those skilled in the art that various changes and modifications may be made therein without departing from the scope of the invention as defined by the appended claims.

What is claimed is:

1. An electroluminescent display system comprising:
   a plurality of thin-film electroluminescent elements each having a digit electrode and a segment electrode and having associated therewith a characteristic electroluminescent threshold voltage;
   a set of digit driver means each selectively coupled to digit electrodes of the elements of said display and having an input terminal for receiving a digit control signal including precharging portions and addressing portions; and
   a set of segment driver means each selectively coupled to segment electrodes of the elements of said display and having an input terminal for receiving a segment control signal including precharging portions and energizing portions which are simultaneous with the addressing portions of the digit control signal;
   said set of digit driver means and said set of segment driver means being operative, during precharging portions of digit and segment control signals, to precharge the elements of said display by applying a first voltage to the digit electrode and a second voltage to the segment electrode of each element of said display, said first and second voltages having a difference therebetween which is greater in magnitude than said threshold voltage,
   said set of digit driver means being further operative, during addressing portions of the digit control signal, to selectively address elements of said display by applying said second voltage to the digit electrodes of the elements of said display which are to be addressed and by applying said first voltage to the digit electrodes of the elements of said display which are not to be addressed, said set of segment driver means being further operative, during energizing portions of the segment control signal, to selectively energize elements of said display which are addressed by applying said first voltage to the segment electrodes of the elements which are to be energized and by applying said second voltage to the segment electrodes of the elements which are not to be energized.

2. The display system as defined in claim 1 wherein each of said set of digit driver means includes means for switching said digit electrodes between said first voltage and said second voltage.

3. The display system as defined in claim 2 wherein each of said set of segment driver means includes means for switching said segment electrodes between said first voltage and said second voltage.

4. The display system as defined in claim 3 wherein the digit control signal includes interdigital portions between addressing portions and the segment control signal includes interdigital portions between energizing portions and wherein said set of digit driver means and said set of segment driver means are further operative, during interdigital portions of the digit and segment control signals, to apply substantially the same voltage to the digit electrode and the segment electrode of each element of said display.

5. The display system as defined in claim 4 wherein said electroluminescent elements each include an electroluminescent layer consisting essentially of a compound having the formula AB wherein A is selected from the group consisting of zinc and cadmium and B is selected from the group consisting of oxygen, sulfur, selenium, and tellurium, said compound including a dopant selected from the group consisting of manganese, the rare earth elements, and mixtures thereof.

6. The display system as defined in claim 4 wherein said electroluminescent elements each include an electroluminescent layer consisting essentially of a compound having the formula $AB_2$ wherein A is selected from the group consisting of zinc and cadmium and B is selected from the group consisting of fluorine, chlorine, bromine, and iodine, said compound including a dopant selected from the group consisting of manganese, the rare earth elements, and mixtures thereof.

7. The display system as defined in claim 5 wherein said electroluminescent layer is sandwiched between dielectric layers and wherein said digit and segment electrodes are attached to said dielectric layers.

8. The display system as defined in claim 7 wherein said electroluminescent layer consists essentially of manganese doped zinc sulfide.

9. The display system as defined in claim 8 wherein said set of digit driver means and said set of segment driver means each include transistor switching means.

10. The display system as defined in claim 9 wherein said first voltage is a positive dc voltage and said second voltage is about ground potential.

11. A method for driving an electroluminescent display including a plurality of thin-film electroluminescent elements each having a digit electrode and a segment electrode and having associated therewith a characteristic electroluminescent threshold voltage, said method comprising the steps of:

precharging each of the elements of said display by applying a first voltage to the digit electrode and a second voltage to the segment electrode of each element of said display, said first and second voltages having a difference therebetween which is greater in magnitude than said threshold voltage;

selectively addressing the elements of said display by applying said second voltage to the digit electrode of the elements of said display which are to be addressed and by applying said first voltage to the digit electrode of the elements of said display which are not to be addressed; and selectively energizing the elements of said display which are addressed by applying, simultaneously with said step of addressing, said first voltage to the segment electrodes of the elements which are to be energized and by applying said second voltage to the segment electrodes of the elements which are not to be energized.

12. The method as defined in claim 11 further including the step of applying substantially the same voltage to the digit electrode and the segment electrode of each element of said display during interdigital periods when said display is not being precharged or addressed.

13. An electroluminescent display system comprising:

a plurality of thin-film electroluminescent elements each having a digit electrode and a segment electrode and having associated therewith a characteristic electroluminescent threshold voltage;

means for precharging each of said elements by applying a first voltage to the digit electrode and a second voltage to the segment electrode of each element, said first and second voltages having a difference therebetween which is greater in magnitude than said threshold voltage;

means for selectively addressing said elements by applying said second voltage to the digit electrode of the elements which are to be addressed and by applying said first voltage to the digit electrode of the elements which are not to be addressed; and means for selectively energizing the elements which are addressed by applying, simultaneously with said step of addressing, said first voltage to the segment electrodes of the elements which are to be energized and by applying said second voltage to the segment electrodes of the elements which are not to be energized.

14. The display system as defined in claim 13 further including means for applying substantially the same voltage to the digit electrode and the segment electrode of each element during interdigital periods when said display system is not being precharged or addressed.

15. The display system as defined in claim 13 wherein one of said first voltage and said second voltage is a positive dc voltage and the other of said first voltage and said second voltage is about ground potential.

* * * * *